United States Patent
Chimner

(10) Patent No.: US 9,388,866 B2
(45) Date of Patent: Jul. 12, 2016

(54) SYSTEM AND METHOD FOR CLUTCH PRESSURE CONTROL

(71) Applicant: Eaton Corporation, Cleveland, OH (US)

(72) Inventor: Christian Thomas Chimner, Royal Oak, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/775,468

(22) PCT Filed: Mar. 10, 2014

(86) PCT No.: PCT/US2014/022353
§ 371 (c)(1),
(2) Date: Sep. 11, 2015

(87) PCT Pub. No.: WO2014/164408
PCT Pub. Date: Oct. 9, 2014

(65) Prior Publication Data
US 2016/0069402 A1    Mar. 10, 2016

Related U.S. Application Data

(60) Provisional application No. 61/780,927, filed on Mar. 13, 2013, provisional application No. 61/841,311, filed on Jun. 29, 2013.

(51) Int. Cl.
*F16D 48/02* (2006.01)
*F16D 48/06* (2006.01)

(52) U.S. Cl.
CPC .............. *F16D 48/066* (2013.01); *F16D 48/02* (2013.01); *F16D 2048/0209* (2013.01); *F16D 2048/0221* (2013.01); *F16D 2048/0257* (2013.01)

(58) Field of Classification Search
None
See application file for complete search history.

(56) References Cited

U.S. PATENT DOCUMENTS

| | | |
|---|---|---|
| 4,241,701 A | 12/1980 | Morse |
| 4,951,549 A | 8/1990 | Olsen et al. |
| 5,036,886 A | 8/1991 | Olsen et al. |
| 5,649,459 A | 7/1997 | Murakami et al. |
| 6,003,624 A | 12/1999 | Jorgensen et al. |

(Continued)

FOREIGN PATENT DOCUMENTS

| | | |
|---|---|---|
| JP | 08091066 A | 4/1996 |
| KR | 100525947 B1 | 11/2005 |

*Primary Examiner* — Justin Holmes
(74) *Attorney, Agent, or Firm* — Mei & Mark LLP

(57) ABSTRACT

A clutch system comprises a hydraulic control circuit for controlling a hydraulic system. The hydraulic control circuit comprises processor-executable control instructions to perform a method for controlling hydraulic pressure. The method comprises receiving a target hydraulic pressure. The method generates and outputs pressure control valve commands based on a detected current hydraulic pressure, a detected temperature, and the target hydraulic pressure by implementing proportional integral derivative (PID) calculations and sliding mode calculations while carrying out a closed loop pressure control. The method converts the target hydraulic pressure into motor speed control commands and into motor direct current commands by implementing a linear quadratic regulator (LQR) calculation while carrying out a closed loop speed control. The method controls the electric motor using the motor direct current commands. And, the method controls the pressure control valve by using the pressure control valve commands.

22 Claims, 8 Drawing Sheets

(56) References Cited

U.S. PATENT DOCUMENTS

| | | |
|---|---|---|
| 6,814,681 B2 | 11/2004 | Porter |
| 6,953,411 B2 | 10/2005 | Burns et al. |
| 8,335,628 B2 | 12/2012 | Yoo |
| 8,550,953 B2 | 10/2013 | Valente et al. |
| 8,577,571 B2 | 11/2013 | Einfinger |
| 2002/0142879 A1 | 10/2002 | Porter |
| 2004/0058773 A1 | 3/2004 | Porter |
| 2004/0149505 A1 | 8/2004 | Burns et al. |
| 2004/0159523 A1* | 8/2004 | Duan .................... F16D 25/123 192/70.12 |
| 2008/0277240 A1* | 11/2008 | Kato ...................... F16D 25/02 192/48.606 |
| 2012/0232766 A1 | 9/2012 | Einfinger |
| 2012/0318511 A1 | 12/2012 | Dykstra et al. |
| 2012/0318526 A1 | 12/2012 | Dykstra et al. |
| 2012/0323378 A1 | 12/2012 | Dykstra et al. |
| 2013/0029797 A1 | 1/2013 | Valente et al. |
| 2013/0049671 A1 | 2/2013 | Shilpiekandula et al. |

* cited by examiner

SYSTEM AND METHOD FOR CLUTCH PRESSURE CONTROL

This is a National Stage entry under §371 of Application No. PCT/US2014/022353, filed Mar. 10, 2014, which claims the benefit of priority of U.S. provisional application No. 61/780,927, filed Mar. 13, 2013, and U.S. provisional application No. 61/841,311, filed Jun. 29, 2013, all of which are incorporated herein by reference.

TECHNICAL FIELD

The present invention relates to a clutch pressure control system and a method for controlling clutch pressure, in particular to a clutch pressure control system and method for an electronically controlled limited slip differential (eLSD).

BACKGROUND

In order to control clutch torque transfer in an electronically controlled limited slip differential (eLSD), a control system and method are required to regulate the clutch pressure. However, the system can include non linearities as well as time changing system parameters such as those related to fluid viscosity due to temperature changes or fluid degradation. These variables are not well accounted for in prior control designs.

SUMMARY

It is an object of the present invention to provide a system and method for accurately regulating the clutch pressure.

A clutch system may comprise a hydraulic control circuit and a hydraulic system. A hydraulic system may comprise hydraulic fluid, hydraulic fluid connections, an electric motor powering a pump, an actuation piston of a clutch pack configured to activate or deactivate the clutch pack based on an amount of hydraulic fluid received from the pump, a pressure control valve connected to the clutch actuation piston, a pressure sensor between the electric motor and the clutch actuation piston, a temperature sensor between the electric motor and the pressure control valve, and a sump.

A hydraulic control circuit may comprise as least a processor, a memory device, and processor-executable control instructions stored in the memory device. The control instructions may comprise programming to perform, when executed by the processor, a method for controlling hydraulic pressure. The method may comprise receiving a target hydraulic pressure, detecting a current hydraulic pressure with the pressure sensor, and detecting a temperature of the hydraulic fluid with the temperature sensor. The method may generate and output pressure control valve commands based on the detected current hydraulic pressure, the detected temperature, and the target hydraulic pressure by implementing proportional integral derivative (PID) calculations and sliding mode calculations while carrying out a closed loop pressure control. The method may convert the target hydraulic pressure into motor speed control commands and into motor direct current commands by implementing a linear quadratic regulator (LQR) calculation while carrying out a closed loop speed control. The method may control the electric motor by outputting the motor direct current commands to inputs of the electric motor. And, the method may control the pressure control valve by inputting the pressure control valve commands to inputs of the pressure control valve.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several examples and together with the description, serve to explain the disclosure.

DETAILED DESCRIPTION

Figure 1:
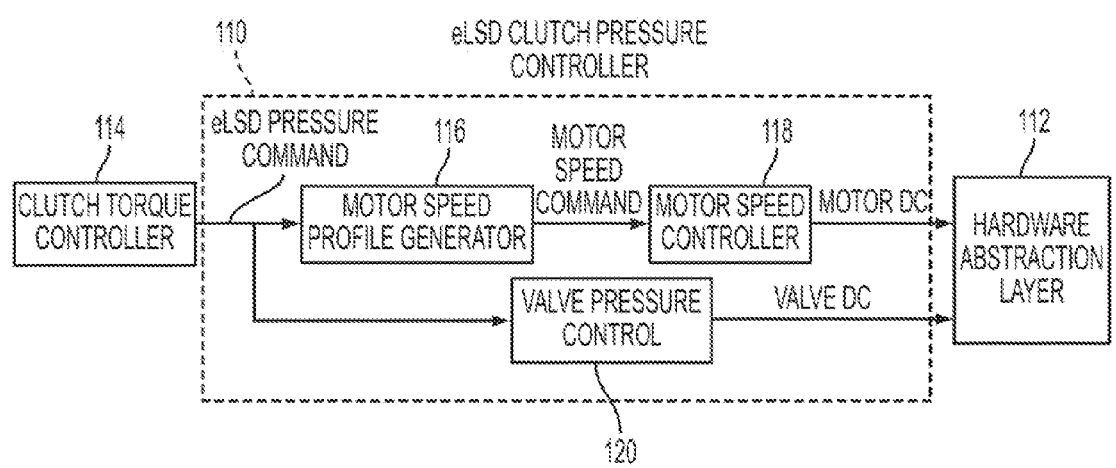
FIG. 1 illustrates an overall structure of a clutch pressure controller including a hydraulic control circuit.

Reference will now be made in detail to the examples illustrated in the accompanying drawings.

A vehicle may comprise several features such as on-board computers, computing chips and other processing devices to control many aspects of vehicle operation. The vehicle may comprise an ASIC and or discrete devices such as hardwired integrated electronic or logic circuits, and or programmable devices such as PLDs, PLAs, or PALs. If the processing device is not hardwired, and is instead programmable, it may contain a memory, processor, and executable programming for performing a desired processing task. The processing devices can interface via various types of wiring, plugs, or other contacts with hardware, such as controllers and sensors.

For example, sensors may be distributed along or within a vehicle driveline to track such things as engine power, steering angle, driveline speeds, longitudinal acceleration, lateral acceleration, yaw rate, throttle position, brake pedal position, or hydraulic control system activity. The data collected by the variety of sensors may be used by the above processing devices to calculate such things as wheel slip, vehicle speed, traction, torque distribution, or AWD (all-wheel drive), FWD (front-wheel drive), or RWD (rear wheel drive) status, among other things. Various control systems and devices may be implemented to respond to the collected data, such as adjusting the torque distribution, adjusting the AWD, FWD, or RWD status, or other vehicle updates.

One possible vehicle change includes locking or unlocking a differential device in the driveline. A differential in an unlocked, or open mode, enables a vehicle to supply different amounts to torque to each axle of the vehicle for such things as allowing different wheel speeds during vehicle turning. A locked differential enables such things as the locking of associated axles so that each affiliated wheel receives the same amount of torque to control such things as wheel slip.

Several classes of differentials are available for use in vehicles. Many are electronically controlled, though some automatically lock via speed-controlled mechanisms. Of the electronically controlled differentials, many include an activation mechanism, such as a clutch pack or other moving discs to go between the locked and open conditions or to enable a limited amount of slip. The clutch pack or discs may cooperate with a fluid operated mechanism such as a piston seated in a fluid housing, that may be pressurized or depressurized to move the clutch pack or discs between open or closed clutch conditions.

This disclosure uses an electronically controlled hydraulic limited slip differential (eHLSD) to illustrate the uses and benefits of the methods disclosed herein, though other electronically controlled clutch devices may benefit from the principles described herein. Since the structure of the eHLSD clutch pack is not changed by the principles disclosed herein, the eHLSD is not shown. However, a prior art eHLSD may be modified to include the pressure valves, temperature sensor, pressure sensor, and control mechanisms described below.

FIG. 1 illustrates an eLSD clutch pressure controller 110. The controller may be part of a central computer system, or the controller may be an independent computing device. That is, the controller may share a processor and memory that is shared with the above-mentioned control and processing systems, or the controller may be a discrete element in the overall processing system, thereby having a dedicated processor and memory for executing and storing the disclosed methods. Either way, the controller has affiliated programming stored in a tangible memory device such as a RAM, ROM, EPROM, disc, or pluggable flash drive. The controller has transmit and receive mechanisms for receiving data inputs and sending signal commands, such as a BUS. If the controller is a discrete device, it is configured and programmed for interface with an available controller area network (CAN). As above, the CAN interfaces with a variety of processing devices, sensors, and actuators and the CAN transmits and receives data. The CAN may be part of a hardware abstraction layer 112.

In the example of FIG. 1, the eHLSD clutch pressure controller 110 is a discrete processing device having a processor, memory and programming separate from the main processing device. The main processing device could instead include allocation programming to integrate the eHLSD clutch pressure controller 110 into the main processing device.

As above, many system parameters may be analyzed to determine when a clutch of an eHLSD must be opened or closed. Separate programming may determine when the clutch is to be activated. In the example of FIG. 1, that open or close programming is part of a separate clutch torque controller 114 that transmits an eHLSD pressure command to the eHLSD clutch pressure controller 110. The eHLSD clutch pressure controller 110 receives and processes the eHLSD pressure command. The eHLSD pressure command may be an indication of a desired fluid pressure for the affiliated clutch, and the command may cause a progressive increase or decrease in fluid pressure such that the fluid pressure progressively increases or decreases based on the eHLSD pressure command.

The eHLSD pressure command is input to a motor speed profile generator 116, which outputs a motor speed command. A motor speed controller 118 receives and processes the motor speed command and outputs a motor DC command to the hardware abstraction layer 112. The eLSD pressure command is also received by a valve pressure control 120, which processes the command to output a valve DC command to the hardware abstraction layer 112.

<Hydraulic System>

The hydraulic systems illustrated may be integrated in to the hardware abstraction layer 112 and may further include connectivity for sending data and receiving commands, as necessary for implementing the disclosed methods.

Figure 2:
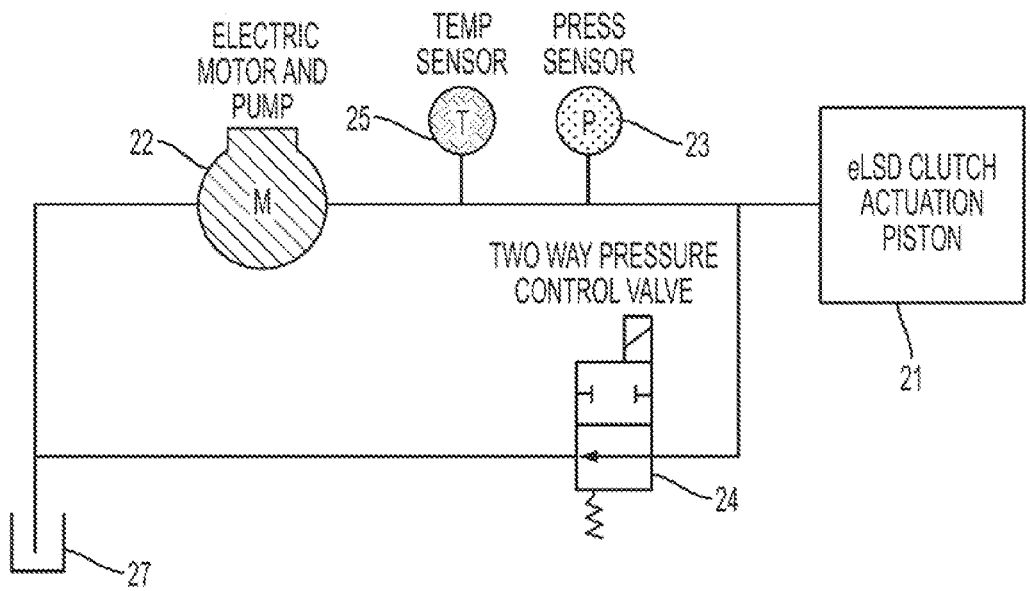
FIG. 2 illustrates a structure of a hydraulic system.

FIG. 2 illustrates the structure of a hydraulic system according to one embodiment. The hydraulic system shown in FIG. 2 comprises an electric motor 22 connected to an eLSD clutch actuation piston 21, a 2-way pressure control valve 24 connected to the eLSD clutch actuation piston 21, a pressure sensor 23, a temperature sensor 25, and a sump 27. The electric motor 22 includes a pump which is used to pump hydraulic fluid from the sump 27 to the inlet of the 2-way pressure control valve 24. The pump is operated at the minimum speed required to exceed the two way valve leakage, which enables fluid to bleed back to the sump 27 once the pressure between the motor 22 and the control valve 24 exceeds the desired clutch pressure setting. The motor speed may be varied, as detailed below, to adjust the clutch pressure setting of the eLSD clutch actuation piston 21.

The electric motor 22 and the pressure control valve 24 are connected in parallel and are connected to the sump 27 on one end and to the eLSD on the other end. The pressure sensor 24 is disposed between the electric motor 22 and the actuation piston 21 to detect the hydraulic pressure. A temperature sensor 25 may also be disposed at the outlet of the motor for fluid temperature feedback so that compensations can be made for differences in fluid viscosity as the fluid temperature changes during operation. After the initial pre-fill of the clutch pack, the pump is operated at the minimum speed required to exceed pressure control valve 24 leakage.

Figure 3:
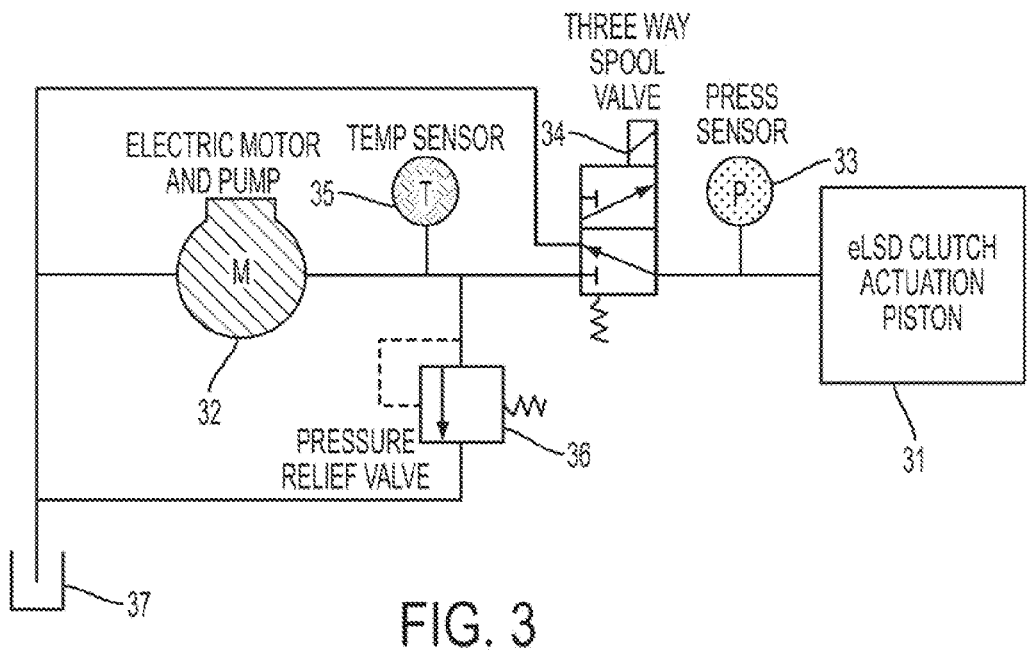
FIG. 3 illustrates a second structure of a hydraulic system.

FIG. 3 illustrates an example of a second hydraulic system. The hydraulic system shown in FIG. 3 comprises an electric motor 32, a 3-way pressure control valve 34 connected to an eLSD clutch actuation piston 31, a pressure sensor 33, a temperature sensor 35, a mechanical pressure relief valve 36, and a sump 37. The electric motor 32 is used to pump hydraulic fluid to the pressure relief valve 36 and the pressure control valve 34. The pressure relief valve 36 is set to open at a pressure greater than the maximum operating pressure of the eLSD clutch. With this design, once the motor is running (excluding a short transition at startup) there will be a positive pressure at the inlet of the pressure control valve 34 that is equal to the cracking pressure of the pressure relief valve 36. This enables the pressure relief valve 36 to operate as a fluid bypass, thereby allowing the motor 32 to run at a constant rate. It also eliminates the need for an accumulator. As detailed below, the motor speed may be varied to adjust the rate of fluid flow to the eLSD clutch actuation piston 31.

The electronically controlled three way pressure control valve 34, which may be a 3-way spool valve, is then used to regulate the pressure that is applied to the clutch pack in a closed loop fashion using feedback from a pressure sensor 33 disposed between the control valve 34 and the eLSD clutch actuation piston 31. A temperature sensor 35 is also located at the outlet of the motor for fluid temperature feedback so that compensations can be made for differences in fluid viscosity as the fluid temperature changes during operation. Fluid can cycle from the pump 32 to the inlet of the three-way valve 34, to the eLSD clutch actuation piston 31 to pressurize the clutch. If the desired clutch pressure has been reached, the motor 32 may operate at a constant rate and the pressure relief valve 36 may act as a bypass to enable fluid to circulate.

To depressurize the clutch, fluid may flow out of a piston housing, enabling the piston to move away from the clutch pack. The fluid may flow to an outlet of the three-way valve 34, then back to the sump 37 or back into the pump 32. The motor may also draw the fluid back by spinning its pump in reverse. Thus, the piston activates or deactivates a clutch pack based on fluid received in or removed from a pressurizable area in the eHLSD. Additional optional features between the clutch pack and the piston, such as a transfer plate or pin, are not discussed herein.

<Control Devices>

As above, and as shown in FIG. 1, the eLSD clutch pressure controller 110 comprises a motor speed profile generator 116, a motor speed controller 118, and a valve pressure controller 120. The motor speed profile generator 116 converts pressure control commands from the clutch torque controller 114 into motor speed control commands. Motor speed profile generator 116 is responsible for selecting target motor speed during pre-fill, quasi steady state tracking, and pressure unloading. The motor speed controller 118 receives motor speed commands from the motor speed profile generator 116 and converts them into PWM (pulse width modulated) voltage commands that are sent to electric motors 22 and 32 shown in FIGS. 2 and 3. Closed loop speed control is achieved using PID (proportional integral derivative) or LQR (linear quadratic regulator) control. The valve pressure controller 120 converts pressure control commands into valve PWM voltage commands. As will be described below in detail, closed loop pressure control is achieved using a combination of a PID, a feed forward (FF), and a sliding mode (SM) controller. Adaptation is utilized to adjust controller gains in real time to improve response time and stability. The combination enables the accurate control of eLSD clutch torque transfer in a robust pressure control strategy. The strategy accounts for system non-linearities and time changing system parameters such as fluid viscosity changes and other hysteresis. The control strategy is adaptive to ensure stability under all conditions and to ensure part to part variations are accounted for.

Motor Speed Profile Generator

Figure 4:
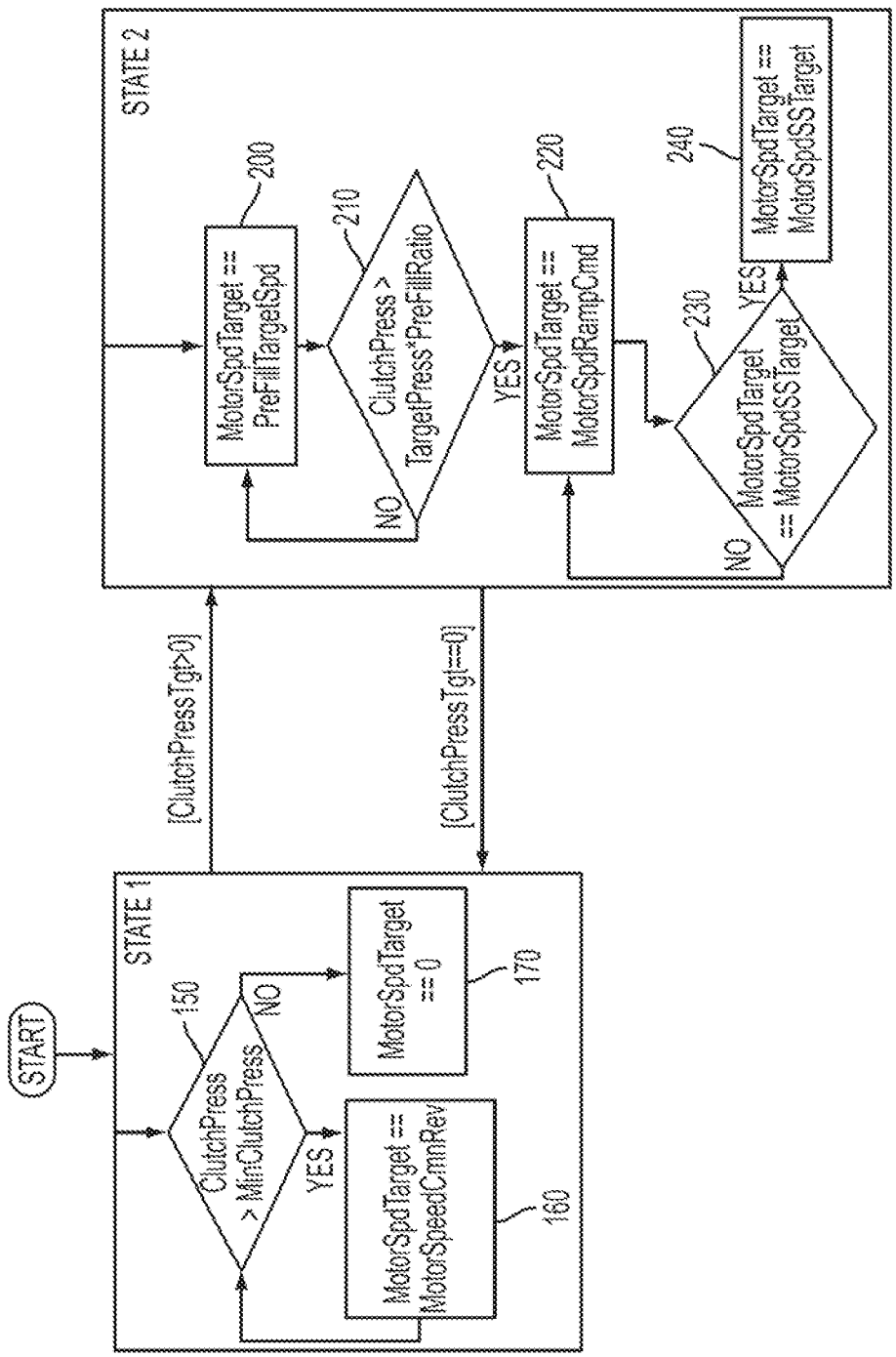
FIG. 4 shows a flowchart for a method used by a motor speed profile generator to generate motor speed control commands.

FIG. 4 shows a flowchart for a method used by the motor speed profile generator to generate motor speed control commands. At a top level, the logic can be divided into two states, i.e., state 1 and state 2. State 1 generates the motor speed command when there is zero for the pressure command, and State 2 generates the motor speed command when the clutch pressure command is greater than zero. At vehicle startup, state 1 is first entered and the eLSD clutch pressure controller 110 will remain in this state until a clutch pressure command is requested.

Upon entering state 1, in step 150, the controller first compares the measured clutch pressure to the minimum clutch pressure threshold (typically 5-10 psi). If the pressure is greater than this minimum clutch pressure threshold target, in step 160, the motor will run in reverse to pull fluid out of the clutch piston. The reverse speed is a parameter that can be calibrated and can be adjusted to get the fluid out of the clutch as fast as possible while maintaining the pump NVH (noise, vibration, and harshness) at an acceptable level. It has been found through testing that the clutch can be depressurized significantly faster by reversing the motor when compared to the case when the fluid is allowed to return to a sump through a valve alone. By returning to step 150, the program rechecks the clutch pressure. Once the clutch pressure is below the minimum clutch pressure threshold value, in step 170, the motor speed command is set to zero and the controller remains idle until a pressure command greater than zero is received.

Another controller in the system may determine that the clutch in the differential must be activated. Communications may be sent to and from the clutch torque controller 114 resulting in the issuance of an eLSD pressure command greater than zero. eLSD clutch pressure controller 110 then switches to state 2. Upon entry into this state, in step 200, the motor speed target is set to a prefill target speed. The prefill target speed is typically the fastest speed that the motor can run while maintaining the pump NVH at an acceptable level. This helps to pressurize the clutch faster since more hydraulic fluid is needed during the initial pressurization when the clutch piston volume is increasing slightly due to clutch pack compliance. The motor command will remain at the prefill level until the clutch pressure begins to approach the target. The clutch pressure is checked in step 210 to determine if the measured pressure exceeds the target pressure multiplied by the prefill target ratio (range 0-1). If the clutch pressure does not exceed this, the process loops back to step 200. If the clutch pressure does exceed the target pressure multiplied by the prefill target ratio, the profile generator begins to ramp the motor speed command to the steady state (SS) motor speed target in step 220.

A ramp program is inserted between the prefill and steady state speed targets for at least two reasons. First it helps to reduce the motor speed undershoot during the transition by approaching the target more gradually. Secondly, the ramp program gives the valve controller time to compensate for differences in fluid flow which result from the different motor speeds. The compensation is particularly beneficial to the 2-way valve architecture due to the reduced number of regulating structures in the architecture.

The motor speed is ramped to its desired steady state speed during step 220, and the program checks, in step 230, to ensure that the motor speed steady state has been achieved. If not, the program returns to step 220, and if so, in step 240, the motor speed target is kept at the steady state target until the clutch pressure target is returned to zero.

The steady state speed is chosen to be at or near the lowest possible speed that the motor can operate at while still providing enough flow to overcome the valve (24 or 36) leakage. For example, the motor speed can be run at 200 RPM. By running the motor at this lower steady state speed, the overall efficiency of the system is improved since the power consumed by the motor is reduced. The motor will remain at this speed until the pressure command is again set to zero. Once reset to zero, the controller runs through state 1 as previously described.

Motor Speed Controller

Figure 5A:
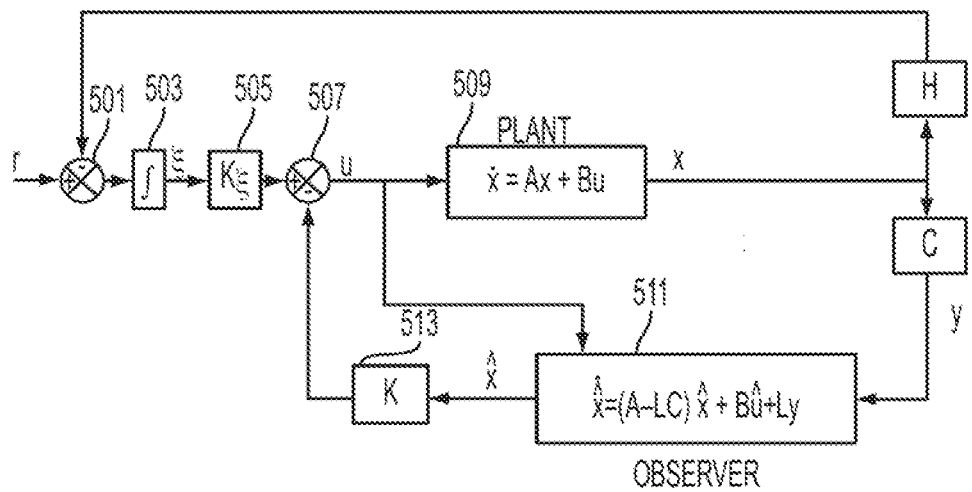
FIG. 5A shows a flowchart for a method used by a motor speed controller to generate a PWM voltage command.

FIG. 5A shows a flowchart for a method used by the motor speed controller to generate PWM voltage commands. The strategy improves controllability of the system by giving advance prediction of what the system will do. For these and other equations herein disclosed, unless otherwise noted, "dot" and "hat" have their customary meanings such that a dot over a variable is a first derivative and a hat over a variable is an estimate of the variable. A dot and hat is a derivative of an estimate. To accurately control the motor speed, a linear quadratic regulator (LQR) with integration is used.

The overall control method is illustrated in FIG. 5A. This method utilizes an observer, such as an extended Kalman filter, to predict the motor speed and current in real time. The feedback to the extended Kalman filter is the measured motor speed. Using the estimated states ($\hat{x}$) along with the integrated error ($\xi$) a control input u is generated.

The target speed, or a set point, r is input to a summing block 501 with a predicted speed output from a picking matrix H. The result is input to an integrator 503 and an error ($\xi$) result is output to a multiplier and multiplied by a gain K. That result is input to another summing block 507 along with a gain-modified estimated state ($\hat{x}$) to output a control input u. This compares the integrated error with feedback from the observer.

The control input u is fed to the motor in the system (plant 509). A model for the plant is shown using a derivative of the state ($\dot{x}$, or x_dot) equal to Ax+Bu. From the plant, an output state x of the model for the plant is input to a picking matrix H. And, a sensor measures the actual speed y of the plant for use with matrix C. In this example, the matrix H and the matrix C are identical.

Measured speed, y, from the plant sensor is input to an observer 511. The control input u is also input to the observer 511. The observer 511 provides a prediction of the system states (estimated state $\hat{x}$, or x_hat) and outputs an estimate (x_dot_hat) of the motor current and the motor speed (the estimate may be in matrix form). A simplified representation of the observer 511 includes a first derivative of the estimated state equal to $(A-LC)\hat{x}+B\hat{u}+Ly$, where A and B are the same matrices used above and below, L is a gain for correcting both the estimated speed and the estimated current, C is a matrix state such as [0,1], $\hat{u}$ ("u_hat") is an estimated control input.

The observer prediction is fed to an operator 513 to be operated on by a two-dimensional gain K and the output of the operator 513 is input to summing block 507.

To tune the control gains, first derive a model for the DC motor. For equation 1, shown below, the equation for the plant 509 is shown in matrix form, with the derivative of the state x expanded to a matrix for a derivative of the current and a derivative of the speed equal to a matrix for A times a matrix for the current and speed plus a matrix for B times a matrix for the control inputs u:

$$\begin{bmatrix} \dot{x}_1 \\ \dot{x}_2 \end{bmatrix} = \begin{bmatrix} -\frac{R_a}{L_a} & -\frac{K_{Beq}}{L_a} \\ \frac{K_{Teq}}{J_{eq}} & -\frac{D_{eq}}{J_{eq}} \end{bmatrix} \begin{bmatrix} x_1 \\ x_2 \end{bmatrix} + \begin{bmatrix} \frac{K_{amp}}{L_a} & 0 & 0 \\ 0 & -\frac{1}{J_{eq}} & -\frac{1}{J_{eq}} \end{bmatrix} \begin{bmatrix} u_1 \\ u_2 \\ u_3 \end{bmatrix} \quad \text{eq. 1}$$

Where $x_1$ is motor current and $y=x_2$=motor speed. For the matrix A, $R_a$ is a resistance of the motor winding, $L_a$ is an inductance of the motor winding, $K_{Beq}$ is a back EMF for the motor, $K_{Teq}$ is a torque constant for the motor, $D_{eq}$ is a coefficient of viscous friction, and $J_{eq}$ is a moment of inertia. For the matrix B, $K_{amp}$ is an amplification constant.

Speed, current, and the control input are also representable as below:

$$\begin{bmatrix} x_1 \\ x_2 \end{bmatrix} = \begin{bmatrix} i_a \\ \dot{\theta}_n \end{bmatrix}, \quad \text{eq. 2}$$

$$u = \begin{bmatrix} V_a \\ \tau_{STICK} \\ \tau_{LOAD} \end{bmatrix}$$

Where $i_a$ is motor current, Omega_dot_sub_a is speed, $V_a$ is applied voltage ($u_1$), $\tau_{STICK}$ is static friction, and $\tau_{LOAD}$ is an external load. $V_a$ may be varied based on desired control commands while $\tau_{STICK}$ and $\tau_{LOAD}$ may remain constant or vary as a function of the pump hardware and the operating pressure and operating speed thereof.

Next create an augmented system with the integrator added as follows:

$$\begin{bmatrix} \dot{x}(t) \\ \dot{\xi}(t) \end{bmatrix} = \begin{bmatrix} A & 0_{n \times l} \\ -H & 0_{l \times l} \end{bmatrix} \begin{bmatrix} x(t) \\ \xi(t) \end{bmatrix} + \begin{bmatrix} B \\ 0_{l \times r} \end{bmatrix} u(t) + \begin{bmatrix} 0_{n \times l} \\ I_l \end{bmatrix} r(t) \quad \text{eq. 3}$$

The first line is the derivative of the states over time, which is equal to A times x over time plus B times u over time. The integrated error calculations follow on the second line, where the derivative of the error over time is equal to the negative picking matrix H multiplied by x over time plus an identity matrix I multiplied by the set point over time. Here, the picking matrix H=[0,1]. Other matrix dimensions, n×l, l×l, l×r, n×l, and l, are noted.

Gains are tuned as follows:

$$u(t) = -K \begin{bmatrix} \hat{x}(t) \\ \xi(t) \end{bmatrix} = -[K_x \quad K_\xi] \begin{bmatrix} x(t) \\ \xi(t) \end{bmatrix} \quad \text{eq. 4}$$

So that the following closed loop system:

$$\begin{bmatrix} \dot{x}(t) \\ \dot{\xi}(t) \end{bmatrix} = \begin{bmatrix} A - BK_x & -BK_\xi \\ -H & 0_{l \times l} \end{bmatrix} \begin{bmatrix} x(t) \\ \xi(t) \end{bmatrix} + \begin{bmatrix} 0_{n \times l} \\ I_l \end{bmatrix} r(t) \quad \text{eq. 5}$$

has the desired close loop response. Note that when tuning the gains to the controller it is assumed that $\tau_{STICK}$ and $\tau_{LOAD}$ are equal to zero so that the system will pass the controllability test. The optimal solution for the LQR controller gains are found by solving the solving the Algebraic Riccati Equation (ARE) for P:

$$A^T P + PA - PRB^{-1} B^T P + Q = 0 \quad \text{eq. 6}$$

In the ARE, the matrix A is transposed ($A^T$), and the matrix B is both inverted ($B^{-1}$) and transposed ($B^T$). P is solved for depending on the R and Q chosen, and P can be used to back out gains for the system.

The closed loop gains may be set using:

$$K = R^{-1} B^T P \quad \text{eq. 7}$$

Where R=1, and Q is a tuning matrix used to generate a matrix of gains that indicate the desired closed loop response. K is a three dimensional number for the integrator, current, and speed.

In an alternative embodiment, a similar approach could be used to tune a PID to control the motor speed by generating a lumped parameter transfer function and using pole placement to set the PID gains to achieve the same closed loop response. This approach would use the above Ax+Bu with Laplace transformation.

In order to protect the controller power electronics and the motor during operation, the current can be limited in operation by limiting the peak duty cycle that can be commanded to the motor at a given speed by using the following limits (derived from DC motor model, assuming that motor current is at steady state):

$$DC_{Max} = \begin{cases} \dfrac{i_{Max} * R + \dot{\theta}_{Mot} * K_{BEMF}}{V_{BATT}} * 100\%, & \text{for } \omega \geq 0 \\ \dfrac{-i_{Max} * R + \dot{\theta}_{Mot} * K_{BEMF}}{V_{BATT}} * 100\%, & \text{for } \omega < 0 \end{cases} \quad \text{eq. 8}$$

where $i_{Max}$ is the maximum allowed operating current, R is the motor winding resistance, Theta_dot$_{Mot}$ is the motor speed, $K_{BEMF}$ is the motor back EMF constant, and $V_{BATT}$ is the battery voltage for the noted angular speeds omega ($\omega$).

The above equations use motor speed as foundational inputs, outputs, estimates, and feedbacks. However, motor current may be used instead by making appropriate adjustments. One implementation of this alternative is shown in FIG. 5B.

Figure 5B:
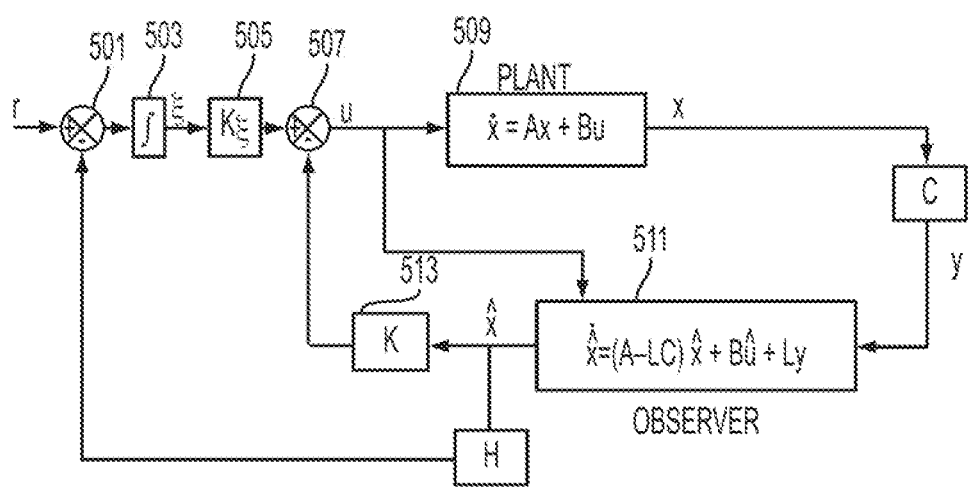
FIG. 5B shows a flowchart for an alternative method used by a motor speed controller to generate a PWM voltage command.

The method of FIG. 5B uses a matrix state such as [1,0] for C to operate using motor current instead of motor speed in the observer 511. This would generate different values of L in the observer 511 that would correct modeling errors based on current feedback instead of speed. In this example, the picking matrix H receives the estimated state (x_hat) output from the observer 511 and uses that to provide a prediction for comparison with the set point r.

The method of FIG. 5B utilizes an observer such as an extended Kalman filter to predict the motor current in real time. The feedback to the extended Kalman filter is the measured motor current. Using the estimated states ($\hat{x}$) along with the integrated error ($\xi$) a control input u is generated.

The target speed, or a set point, r is input to a summing block 501 with a predicted speed output from a picking matrix H. The result is input to an integrator 503 and an error ($\xi$) result is output to a multiplier 505 and multiplied by a gain K$\xi$. That result is input to another summing block 507 along with a gain-modified estimated state ($\hat{x}$) to output a control input u. This allows the comparison of the integrated error with feedback from the observer.

The control input u is fed to the motor in the system (plant 509). A model for the plant is shown using a derivative of the state ($\dot{x}$, or x_dot) equal to Ax+Bu. From the plant, an output state x is sent to a sensor which measures the actual state of the plant 509. The measured state may include both current and speed information, or the measured state may include only the current as measured by a current sensor. The matrix C=[1,0] eliminates the speed information in favor of the current information for the next set of calculations. In this example, the matrix H and the matrix C are not identical. The matrix H is equal to [0, 1].

Measured current, y, is input to an observer 511. The control input u is also input to the observer 511. As above, the observer 511 provides a prediction of the system states (estimated state $\hat{x}$, or x_hat). The output estimate may include a matrix of data, including estimated motor current and the motor speed. As illustrated, x_dot_hat is the derivative of x_hat that is used by the observer to estimate x_hat.

The observer prediction is fed to an operator 513 to be operated on by a two-dimensional gain K and the output of the operator 513 is input to summing block 507. The observer prediction is also fed to the picking matrix H, which selects state information for input to the summing block 501. When the motor speed is selected by the picking matrix, the estimated motor speed can be compared to the target motor speed r for iterative closed loop feedback.

Valve Pressure Controller

Figure 6:
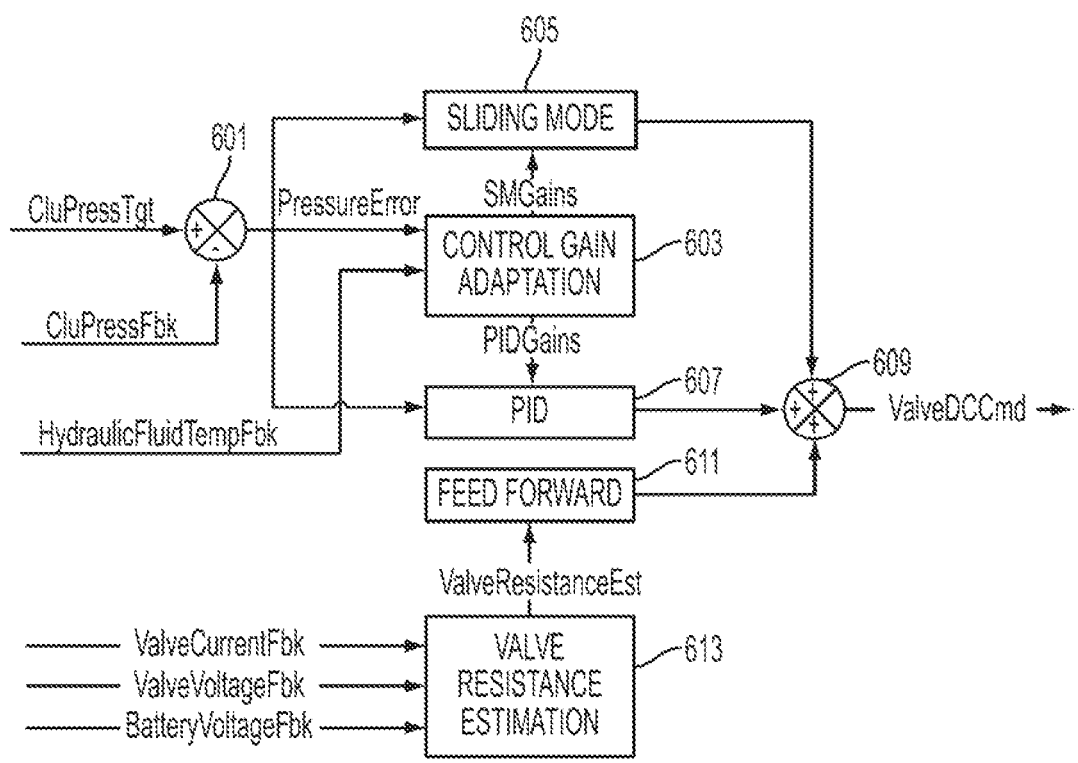
FIG. 6 illustrates a method used by a valve pressure controller to generate a PWM voltage command.

FIG. 6 illustrates a pressure control method used by valve pressure controller to generate PWM voltage command.

Figure 7:
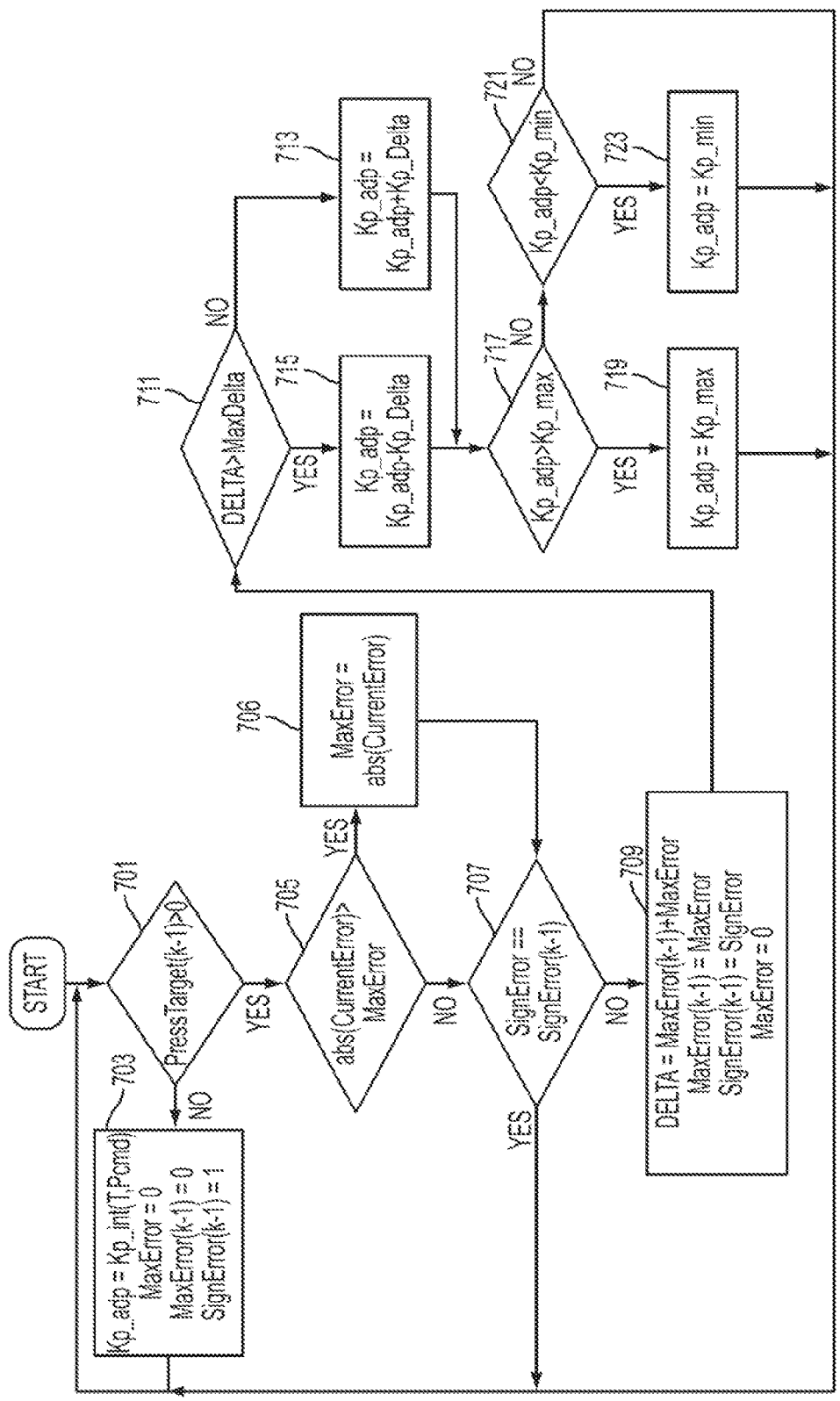
FIG. 7 illustrates an algorithm used for a rule based Kp gain adaptation.

As shown in FIG. 7, the pressure control method uses a PID and a sliding mode controller for closed loop adjustment in combination with an open loop feed forward term. The sliding mode and PID gains are adjusted in real time to ensure that the desired controller stability is always achieved. The PID controller performs most of the correction while the sliding mode controller provides non-linear feedback that helps to cancel out some of the non-linearities in the system. The feed forward term is adjusted by first estimating the valve resistance with a recursive least squares algorithm (RLSE) and then adjusting the duty cycle so that the open loop current is always maintained as the coil resistance changes with temperature. By estimating the open loop resistance and adjusting the open loop PWM duty cycle in this manner, a closed loop current feedback loop for the valve is not needed.

Turning to FIG. 6, a clutch pressure target and a clutch pressure feedback are input to a summing block 601. The clutch pressure target may be selected by the clutch pressure controller 114 and forwarded to the valve pressure control 120. The clutch pressure feedback may be obtained by processing the pressure measured by pressure sensor 23 or 33.

A pressure error, or difference between the clutch pressure target and clutch pressure feedback, is input to a control gain adaptation 603, a sliding mode controller 605, and a PID controller 607. Control gain adaptation 603 performs processing for the logic outlined below in FIGS. 7-9 to output sliding mode gains to the sliding mode controller 605, and to output PID gains to the PID controller 607. The control gain adaptation 603 also receives hydraulic fluid temperature feedback, which may be obtained by processing data received from the temperature sensor 25 or 35.

The PID gains and the SM gains may be constantly adjusted by the control gain adaptation 603. The PID controller 607 and the SM controller 605 may use the input gains along with the error signal inputs to generate independent control outputs. The control outputs output from PID controller 607 and SM controller 605 may be summed together at summing block 609 to generate the final command signal sent to the valve of FIG. 2 or 3.

Valve current feedback and valve voltage feedback are used with battery voltage feedback as inputs for valve resistance estimation controller 613. The inputs may be collected via distributed sensors or via monitoring of electronic settings. The valve resistance estimation controller 613 outputs a valve resistance estimation, which is input to a feed forward controller 611.

The outputs of the sliding mode controller 605, the PID controller 607, and the feed forward 611 are input to a summing block 609 to result in a final valve DC command for the direct current of the closed loop valve 24 or 34.

The combined controller can be represented by the following control equation:

$$DC_{VALVE} = FF(t) + K_p(t)e + K_i(t) \int e\, dt + \qquad \text{eq. 9}$$

$$K_D(t)\frac{de}{dt} + K_{SM}(t) \cdot sat(e, -1, 1) + Dither(t)$$

where $DC_{VALVE}$ signifies the voltage command generated to command the pressure control valve 24 and 34 shown in FIGS. 2 and 3; FF(t) stands for a time dependent Feed Forward; e is an error, or difference between target and actual voltage;

$$K_p(t)e + K_i(t) \int e\, dt + K_D(t)\frac{de}{dt}$$

are the terms used for PID control and are described more below; $K_{SM}(t) \cdot sat(e,-1,1)$ is the term for the sliding mode control; and Dither(t) is a fixed amplitude square wave that can be added on top of the valve DC command $DC_{VALVE}$ in order to keep the valve slightly moving at all times, thereby reducing valve hysteresis.

PID Controller

PID controller (proportional-integral-derivative controller) 607 is a control loop feedback mechanism (controller) used in industrial control systems. A PID controller calculates an "error" value as the difference between a measured process variable and a desired set point. The controller attempts to minimize the error by adjusting the process control inputs. The PID controller calculation involves three separate constant parameters, and is accordingly sometimes called three-term control: the proportional (P), the integral (I), and derivative (D) values. The weighted sum of these three actions is used to adjust the process via a control element, which in this instance may be the position of the pressure control valves.

In the present case, the PID controller is represented by the term $$K_p(t)e + K_i(t)\int e\,dt + K_D(t)\frac{de}{dt}$$

in the aforementioned control equation, where $K_p(t)e$ is the proportional value with the coefficient $K_p(t)$ named as the "proportional gain" or "Kp gain", $K_i(t)\int e\,dt$ is the integral value with the coefficient $K_i$ named as the "integral gain" or "Ki gain", and $$K_D(t)\frac{de}{dt}$$

is the derivative value with the coefficient Kd named as the "derivative gain" or "Kd gain".

The 3 parameters, i.e. the "Kp gain" $K_p(t)$, the "Ki gain" $K_i$, and the "Kd gain" $K_d$, are adjusted in real time to achieve the desired stability.

Kp Gain Adaption

The rule based Kp gain adaptation method for this controller is illustrated below in FIG. 8. The algorithm continuously updates the initial starting value of Kp as Kp_adp until it detects that the pressure control loop has been switched on in the previous time step, such as by moving from state 1 to state 2. The initial starting valve of Kp (Kp_int) is calculated using a lookup table that is a function of hydraulic fluid temperature and the current pressure target. This gain scheduling map allows Kp to be optimized over the full range of fluid viscosities and pressure targets so that a near constant response time and overshoot can be maintained at all operating conditions.

Once the control loop has been activated, the algorithm begins to estimate the amplitude of the oscillation of the clutch pressure around the target during tracking To do this the algorithm first calculates the maximum error of the measured pressure in each direction (positive and negative sign) of the target. Each time the error sign changes, the algorithm calculates the peak to peak amplitude of the error signal by adding the current peak error and the last calculated value for the peak error when the error signal was in the opposite direction (MaxError(k−1)). If this error delta is greater than a calibratable threshold MaxDelta (5 psi for example), the value of Kp_adp is reduced by an amount Kp_Delta. The amount Kp_Delta may be determined and set during calibration testing to be slightly larger than a noise observed during a constant duty cycle command.

If the error delta is less than or equal to MaxDelta, then the value of Kp_adp is increased by Kp_Delta. MaxDelta therefore sets the maximum amount of oscillation that the controller should target. By adjusting Kp in this manner, the controller gains are set at an optimal point that provides the strongest possible controller response while maintaining the desired stability.

To ensure that the gain does not run away in either direction, after each update the algorithm checks to make sure the value of Kp_adp is between a defined minimum and maximum value (Kp_min and Kp_max). If it is outside these limits then the algorithm saturates the value at the appropriate limit. The algorithm then continues to repeat the process until the pressure control loop is deactivated (PressTarget(k−1)==0), such as by return to state 1.

The representation of the rule based Kp adaptation strategy of FIG. 7 shows that, in step 701, the program checks if the pressure target at (k−1) is greater than zero. If not, then in step 703, the adapted Kp (Kp_adp is equal to the initial Kp (Kp_int) for that temperature and pressure command. In addition, the maximum error is equal to zero, the maximum error at (k−1) is equal to zero, and the sign error at (k−1) is equal to one. The process returns to step 701 for a re-check of the pressure target at (k−1) and when that value is greater than zero, the process moves to step 705 to check if the absolute value of the current error is greater than a maximum error. If yes, the process continues to step 706 to set the maximum error equal to the absolute value of the current error and then proceeds to step 707; and if step 705 returns a negative answer, the process moves to step 707 to check if a sign error is equal to a sign error at (k−1). If step 707 returns a positive answer, then the process returns to step 703, and if step 707 returns a negative answer, the process proceeds to step 709.

In step 709, the program sets a Delta equal to a maximum error at (k−1) plus a present maximum error. A maximum error at (k−1) is set to a present maximum error. A sign error at (k−1) is equal to a present sign error. And, the present maximum error is set to zero. With these settings, the process moves to step 711 to determine if delta is greater than a maximum delta.

If step 711 provides a negative answer, the program, in step 713, sets the adapted Kp (Kp_adp) equal to the adapted Kp plus a delta Kp (Kp_Delta). If step 711 provides an affirmative answer, the program moves to step 715 to set the adapted Kp equal to the adapted Kp minus a delta Kp.

The process moves to step 717 to determine if the adapted Kp is greater than a maximum Kp. If yes, then in step 719 the adapted Kp is set equal to the maximum Kp and the program returns to step 701. If step 717 results in a negative answer, the process moves to step 721 to check if the adapted Kp is less than a minimum KP (Kp_min). If not, the program returns to step 701; if yes, the program moves to step 723 to set the adapted Kp equal to the minimum Kp and then returns to step 701.

Kd Gain Adaption

The rule based Kd gain adaptation ($K_D$) is identical in flow to the method used to adjust Kp. However, different limits and thresholds may be used to adjust the valve of Kd.

Ki Gain Scheduling

Figure 8:
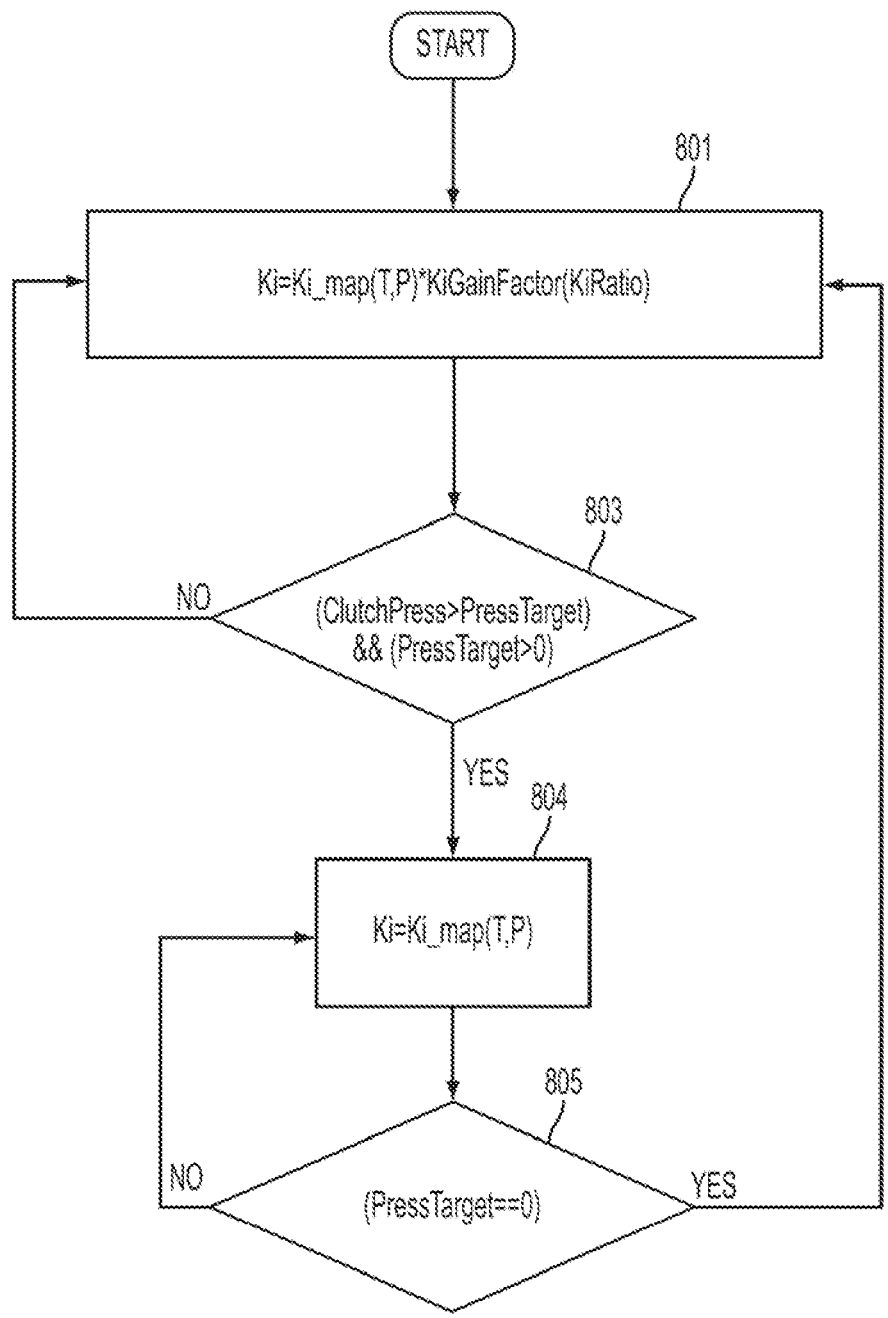
FIG. 8 illustrates an algorithm used for a Ki gain adaptation.

FIG. 8 illustrates the algorithm used for the Ki gain adaptation. To reduce the pressure overshoot caused by the Ki gain feedback, a gain scheduling method was developed. This method utilizes a ratio factor (KiRatio) that increases as the measured clutch pressure approaches the target. This ratio factor is calculated as a saturated ratio for saturation limits zero and one:

$$KiRatio = sat\left(\frac{ClutchPress}{PressureTarget}, 0, 1\right) \qquad \text{eq. 10}$$

where ClutchPress is the measured clutch pressure and PressureTarget is the target clutch pressure.

When the clutch pressurization is initially commanded, this index will be close to zero since the clutch pressure will be near zero. As the clutch pressure approaches the target the ratio will approach one. This ratio is used as an input to a gain scheduling map that increases a multiplication factor(KiGainFactor, range 0-1) to scale the Ki gain. The Ki gain is also a function of the current pressure target and hydraulic fluid temperature.

Once the measured pressure exceeds the target, the multiplication factor KiGainFactor is latched at 1 which holds the maximum value of Ki. This enables better closed loop tracking without the large overshoot you would see from a PID with a large Ki gain setting.

After the clutch pressure command is removed the scheduling is reinitialized by removing the latch and returning the KiGainFactor to the value generated at the current KiRatio.

Turning to FIG. 8, the Ki gain scheduling strategy is represented in a flow diagram. In the initial step, the integral gain Ki is equal to an initial Ki (Ki_int or Ki_map) which is a function of temperature and pressure times the multiplication factor KiGainFactor for a given KiRatio. The program moves to step 803 to check if the clutch pressure is greater than the target pressure and also to check if the target pressure is greater than zero. If not, the process returns to step 801. If both answers of step 803 are yes, then the program moves to step 804 to make the adjustment to subtract the initial Ki at a given temperature and pressure from the present integral gain. The process moves to step 805 to check if the target pressure is equal to zero. If not, the process returns to step 804, and if the target pressure is zero, the program returns to step 801.

Sliding Mode Controller

A sliding mode control, or SM control, is a nonlinear control method that alters the dynamics of a nonlinear system by application of a discontinuous control signal that forces the system to "slide" along a cross-section of the system's normal behavior.

In the present case, the SM control is represented by the term $K_{SM}(t) \cdot sat(e,-1,1)$ in the aforementioned control equation, with the coefficient $K_{SM}(t)$ named as the "SM gain." The parameter Ksm is adjusted in real time to achieve the desired stability.

Figure 9:
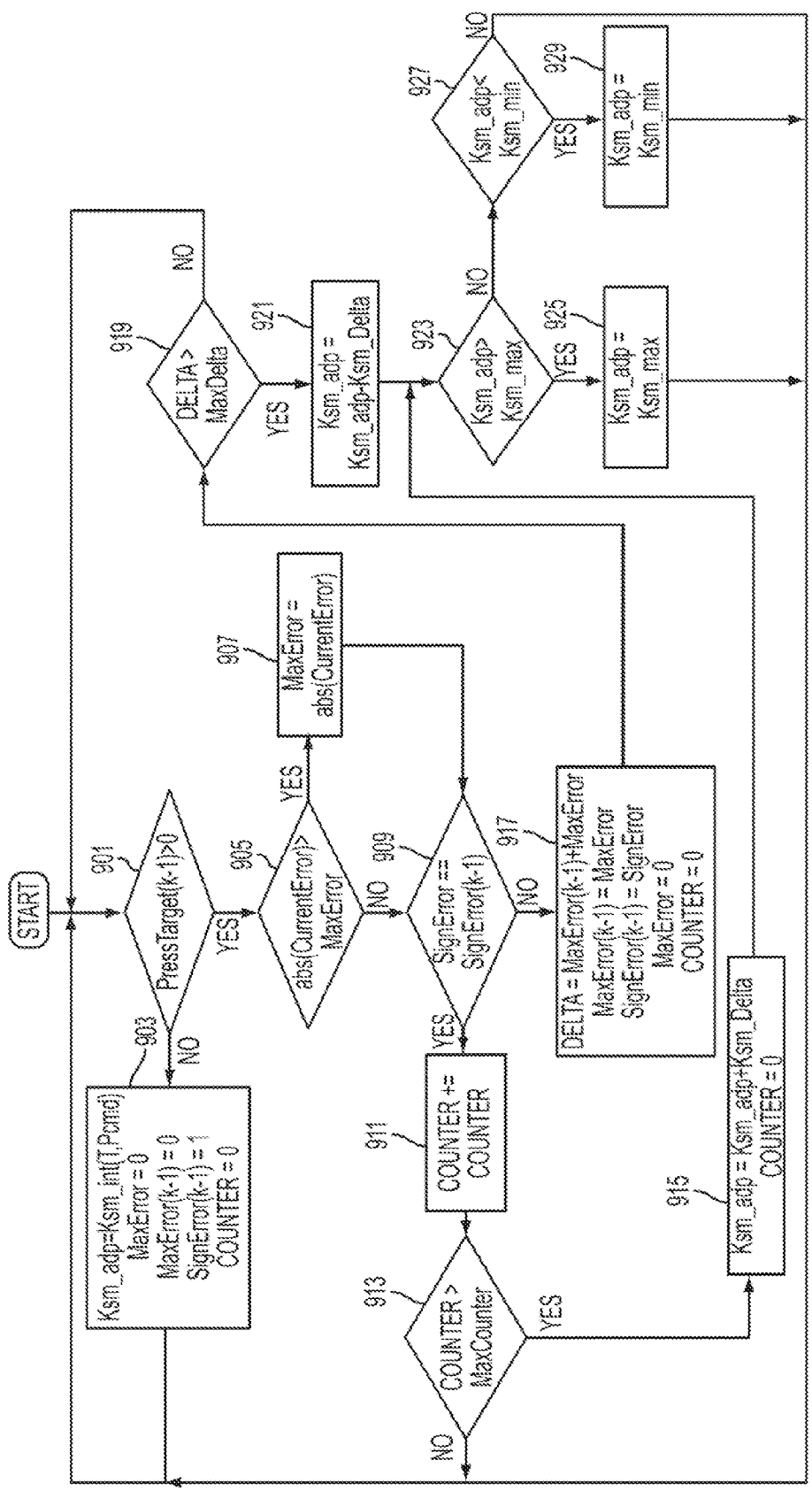
FIG. 9 illustrates an algorithm used for a Ksm gain adaptation.

FIG. 9 illustrates the algorithm used for the Ksm gain adaptation.

The sliding mode gain adaptation works very similarly to the gain adaptation used for the Kp and Kd gains described previously. However, a counter has been added to increase the value of Ksm_adp if the sign of the error is taking too long to change rather than using the oscillation amplitude to increase the value of Ksm. This is accomplished by incrementing a counter on every loop of the algorithm while the sign of the error signal is not changing. If the current value of the counter exceeds the threshold MaxCounter, then Ksm_adp is incremented by Ksm_Delta regardless of the value that is calculated from the peak to peak delta. If the sign of the error switches before the counter gets to its maximum value, then Ksm_adp is decremented if the amplitude of the oscillation is greater than MaxDelta. If the oscillation amplitude is less than MaxDelta, and the sign of the error switches before MaxCounter is reached, then no action is taken and Ksm_adp remains at its previous setting. This helps to get the pressure quickly to target when the error is small since the magnitude of Ksm is fixed and the feedback is at its maximum value for all pressures greater than 1 psi and less than −1 psi.

The sliding mode adjustment is capable of forcing the system to the target. The sliding mode adjustment works with the above dither to reduce system hysteresis, and may force the system to the target faster than when using the above dither alone, especially when a small offset is present.

Turning to FIG. 9, a series of discrete target pressure samples k are analyzed. In step 901, the program checks if the target pressure at (k−1) is greater than zero. Since k is a discrete sample index, (k−2) is a sample value taken two samples ago in a series. Similarly, (k−1) would be a sample taken one sample ago, and (k) would be the current sample. If the check result of step 1 is negative, in step 903, the program sets the adapted Ksm equal to an initial Ksm at a particular temperature and pressure command, and then the process returns to step 901. If the result of step 901 is affirmative, then the program moves to step 905 to determine if the absolute value of the current error is greater than a maximum error. If yes, then the program moves to step 907 to set the maximum error equal to the absolute value of the current error, and then moves to step 909. If step 905 has a negative result, then the process moves to step 909.

Step 909 checks if a sign error is equal to a sign error at (k−1). If yes, then in step 911, a counter is increased and the program moves to step 913 to determine if the counter is greater than a maximum counter. If not, the process returns to step 901. If the counter is greater than a maximum counter, the program moves to step 915 to set the adapted Ksm equal to the adapted Ksm plus a Delta Ksm. The counter is also set to zero. The program then moves to step 923.

However, if the result of step 909 is negative, the program moves to step 917 to set Delta equal to a maximum error at (k−1) plus a maximum error, set a maximum error at (k−1) equal to a present maximum error, set a sign error at (k−1) equal to a present sign error, set a present maximum error equal to zero, and set a counter equal to zero. The program then moves to step 919.

In step 919, the Delta is checked to ensure if it is greater than a maximum Delta. If not, the process returns to step 901, and if yes, the process moves to step 921. In step 921, the adapted Ksm is set equal to a present value for adapted Ksm minus a Delta Ksm. The program then moves to step 923 to check if the adapted Ksm is greater than a maximum Ksm. If so, then the adapted Ksm is set equal to the maximum Ksm and the process returns to step 901. If the if the adapted Ksm is not greater than a maximum Ksm, the process moves to step 927 to check if the adapted Ksm is less than a minimum Ksm. If not, then the process returns to step 901. If so, then in step 929 the program sets the adapted Ksm equal to the minimum Ksm before returning to step 901.

Feed Forward Term

In the present case, the feed forward term is represented by the term FF(t) in the aforementioned $DC_{VALVE}$ control equation. The feed forward term is adjusted by first estimating the valve resistance with a recursive least squares algorithm (RLSE) and then adjusting the duty cycle so that the open loop current is always maintained as the coil resistance changes with temperature.

To estimate the valve resistance the following recursive least squares (RLSE) algorithm is used:

$$H_{m+1} = [i_{VALVE}(m+1)] \qquad \text{eq. 11-14}$$

$$K_{m+1} = P_m H'_{m+1} (H_{m+1} P_m H'_{m+1} + \lambda)^{-1}$$

$$\hat{R}(m+1) = \hat{R}(m) + K_{m+1}(V_{Valve}(m+1) - H_{m+1}\hat{R}(m))$$

$$P_{m+1} = \frac{1}{\lambda}[I_n - K_{m+1}H_{m+1}]P_m$$

Where m is a discrete time index, λ is a forgetting factor, $i_{VALVE}$ is the measured valve current, $V_{VALVE}$ is the measured voltage across the valve, and $\hat{R}$ is the estimated valve resistance. Using this information, a one dimensional feed forward (1-D FF) duty cycle map can be used to generate the desired open loop duty cycle (DC) command for all conditions using the following relationship:

$$DC_{CORR}(t) = \frac{V_{NOM} * DC_{NOM}(P_{DES}) * \hat{R}_{VALVE}(t)}{R_{NOM} * V_{BATT}(t)} \quad \text{eq. 15}$$

Where $DC_{NOM}$ is the feed forward FF duty cycle (function of the desired pressure) map tuned at the nominal resistance $R_{NOM}$ and battery voltage $V_{NOM}$, the current measured battery voltage is $V_{BATT}$, and the current estimated valve resistance is $R_{VALVE}\_hat$.

FIG. 10 shows test results for the method described above. For these tests the motor was commanded on as fast as possible to build pressure and was set to run at 500 rpm during steady state pressure tracking. For all steps a rise time <90 ms was achieved.

In the preceding specification, various preferred embodiments have been described with reference to the accompanying drawings. It will, however, be evident that various other modifications and changes may be made thereto, and additional embodiments may be implemented, without departing from the broader scope of the claims that follow. The specification and drawings are accordingly to be regarded in an illustrative rather than restrictive sense.

Other embodiments will be apparent to those skilled in the art from consideration of the specification and practice of the disclosure. It is intended that the specification and examples be considered as exemplary only, with the true scope and spirit of the invention being indicated by the following claims.

I claim:

1. A clutch system comprising a hydraulic control circuit and a hydraulic system, the hydraulic system comprising hydraulic fluid, hydraulic fluid connections, an electric motor powering a pump, an actuation piston of a clutch pack configured to activate or deactivate the clutch pack based on an amount of hydraulic fluid received from the pump, a pressure control valve connected to the clutch actuation piston, a pressure sensor between the electric motor and the clutch actuation piston, a temperature sensor between the electric motor and the pressure control valve, and a sump, and the hydraulic control circuit comprising at least control and data connectivity to the hydraulic system, a processor, a memory device, and processor-executable control instructions stored in the memory device, the control instructions comprising programming to perform, when executed by the processor, a method for controlling hydraulic pressure comprising:

receiving a target hydraulic pressure;
detecting a current hydraulic pressure with the pressure sensor;
detecting a temperature of the hydraulic fluid with the temperature sensor;
generating and outputting pressure control valve commands based on the detected current hydraulic pressure, the detected temperature, and the target hydraulic pressure by implementing proportional integral derivative (PID) calculations and sliding mode calculations while carrying out a closed loop pressure control;
converting the target hydraulic pressure into motor control commands and into motor duty cycle commands by implementing a linear quadratic regulator (LQR) calculation while carrying out a closed loop control;
controlling the electric motor by outputting the motor duty cycle commands to inputs of the electric motor; and
controlling the pressure control valve by inputting the pressure control valve commands to inputs of the pressure control valve.

2. The clutch system of claim 1, wherein the hydraulic system circulates, in a forward direction, hydraulic fluid via the hydraulic fluid connections from the sump to the electric motor and pump, then to the temperature sensor, then to either the pressure control valve or to a pressure relief valve, and when to the pressure control valve, then to the pressure sensor, then to the actuation piston, and wherein the control instructions further comprise programming to reverse fluid flow through the electric motor and pump to draw fluid from the actuation piston to the sump.

3. The clutch system of claim 2, wherein:
the pressure control valve is a three way spool valve comprising an inlet, a first outlet connected to the actuation piston, and a second outlet connected to both the pump and the sump;
the pressure relief valve has a cracking pressure; and
the control instructions further comprise programming to run the motor at a speed sufficient to create a fluid pressure at the inlet of the pressure control valve, and the fluid pressure is equal to or greater than the cracking pressure of the pressure relief valve.

4. The clutch system of claim 1, wherein the hydraulic system circulates, in a forward direction, hydraulic fluid via the hydraulic fluid connections from the sump to the electric motor and pump, then to the temperature sensor and pressure sensor, then to both the actuation piston and the pressure control valve, wherein the pressure control valve is a two way spool valve, and wherein the control instructions further comprise programming to reverse fluid flow through the electric motor and pump to draw fluid from the actuation piston to the sump.

5. The clutch system of claim 1, further comprising a clutch torque controller, the clutch torque controller comprising data inputs connected to sensors, data outputs, a memory device, a processor, and processor-executable control programming stored in the memory device for implementing a method comprising processing data inputs to calculate the target hydraulic pressure for the clutch pack, and outputting the target hydraulic pressure.

6. The clutch system of claim 5, wherein the hydraulic control circuit further comprises a data input, at least one data output, a motor speed profile generator, a motor speed controller, and a valve pressure controller, wherein the data input receives the target hydraulic pressure from the clutch torque controller and forwards the target hydraulic pressure to the motor speed profile generator and to the valve pressure controller.

7. The clutch system of claim 6, wherein:
the motor speed profile generator receives and processes the clutch pressure command to determine if the desired clutch condition requires forward motor operation, reverse motor operation, or no motor operation, and, based on the determination, the motor speed profile generator outputs a target motor speed to the motor speed controller,
when forward motor operation is required, the motor speed profile generator sets the output target motor speed to a prefill target motor speed, receives a pressure signal from the pressure sensor, calculates a relationship between the received pressure signal, a target pressure, and a prefill target ratio, and, when the relationship indicates a predetermined ratio, the motor speed profile generator ramps the output target motor speed from the prefill target motor speed to a steady state target motor speed, and when the reverse motor operation is required, the motor speed profile generator outputs a signal to reverse motor speed.

8. The clutch system of claim 7, wherein the motor speed controller receives and processes the target motor speed from the motor speed profile generator and outputs voltage pulse width modulated duty cycle commands to the electric motor, and the motor speed controller processing comprises executing stored instructions to perform the steps of:

(1) combining the target motor speed with a predicted motor speed and operating on the result of the combination with error and gain algorithms;

(2) combining the result of the operation of step 1 with a first estimated motor state and outputting a control input;

(3) feeding the control input to the electric motor;

(4) sensing and outputting a matrix comprising electric motor speed and electric motor current;

(5) processing the output matrix in a picking matrix to determine a next predicted motor speed;

(5) creating a measured speed matrix from the output matrix and inputting the measured speed matrix in to an observer algorithm;

(6) outputting, from the observer algorithm, an estimate of the electric motor state; and (7) combining the estimate of the electric motor state with a gain matrix to create a next estimated state.

9. The clutch system of claim 7, wherein the motor speed controller receives and processes the target motor speed from the motor speed profile generator and outputs voltage pulse width modulated duty cycle commands to the electric motor, and the motor speed controller processing comprises executing stored instructions to perform the steps of:

(1) combining the target motor speed with a predicted motor speed and operating on the result of the combination with error and gain algorithms;

(2) combining the result of the operation of step 1 with a first gain-modified estimated motor state and outputting a control input;

(3) feeding the control input to the electric motor and compiling a matrix comprising electric motor speed and electric motor current;

(4) inputting the electric motor current in to an observer algorithm for processing;

(5) outputting an estimated motor state from the observer algorithm;

(6) inputting the estimated motor state to a picking matrix for selection of a next predicted motor speed; and (7) combining the estimated motor state with a gain matrix to create a next estimated state.

10. The clutch system of claim 7, wherein the motor speed controller receives and processes the target motor speed from the motor speed profile generator and outputs voltage pulse width modulated duty cycle commands to the electric motor, and the motor speed controller processing comprises executing instructions to implement a linear quadratic regulator (LQR) with integration, an extended Kalman filter, and motor speed feedback.

11. The clutch system of claim 6, wherein the valve pressure controller receives and processes the target hydraulic pressure to determine a valve pulse width modulated duty cycle command, and the processing comprises executing stored instructions to:

compare the target hydraulic pressure with the detected current hydraulic pressure and determine a clutch pressure error;

input the clutch pressure error and a sensed temperature to a gain adaptation controller for processing to output sliding mode gains to the sliding mode controller and to output PID gains to the PID controller, wherein:

the processing to output the PID gains comprises estimating an amplitude of clutch pressure oscillation from a target clutch pressure, constraining clutch pressure overshoot by calculating a ratio of a current clutch pressure to the target clutch pressure, and applying the ratio to a PID gain scheduling algorithm, and the processing to output the sliding mode gains comprises iteratively estimating another amplitude of clutch pressure oscillation from the target hydraulic pressure, and applying a counter if the another amplitude maintains a positive or negative value for more than a predetermined number of iterations of the processing, combine the clutch pressure error with the PID gains in the PID controller to output a PID output;

combine the clutch pressure error with the sliding mode gains in the sliding mode controller to output a sliding mode output;

receive valve current feedback, valve voltage feedback, and battery voltage feedback from valve sensors and perform a recursive least squares estimation to obtain a valve resistance estimation;

input the result of the valve resistance estimation to a feed forward controller and perform calculations to obtain a feed forward command; and combine the sliding mode output, the PID output, and the feed forward command to calculate the pressure control valve command.

12. The clutch system of claim 1, wherein generating pressure control valve commands comprises programming to implement the control equation $$DC_{VALVE} = FF(t) + K_p(t)e + K_i(t)\int e\,dt + K_D(t)\frac{de}{dt} + K_{SM}(t)\cdot sat(e,-1,1) + \text{Dither}(t)$$

where $DC_{VALVE}$ signifies a voltage command for controlling the pressure control valve; $FF(t)$ stands for a time dependent feed forward term, $$K_p(t)e + K_i(t)\int e\,dt + K_D(t)\frac{de}{dt}$$

are terms representing the PID calculations; $K_{SM}(t)\cdot sat(e,-1,1)$ represents the sliding mode calculations; and $\text{Dither}(t)$ is a fixed amplitude square wave.

13. The clutch system of claim 12, wherein $K_p(t)$ is a proportional gain adjusted in real time by continuously updating an initial starting value of $K_p(t)$ until a pressure control loop is switched on when the pressure command is greater than 0, and wherein the initial starting value is calculated using a lookup table that is a function of detected temperature of the hydraulic fluid and the target hydraulic pressure.

14. The clutch system of claim 13, wherein calculating $K_p(t)$ when the pressure control loop is switched on comprises:
(1) iteratively calculating a maximum error of detected fluid pressure in each direction of the target hydraulic pressure and storing the maximum error over time;
(2) comparing a current maximum error to a past maximum error to determine if a sign of error amplitude has changed, and each time the error amplitude sign changes, calculating a peak to peak difference between the current maximum error and the past maximum error;
(3) when the peak to peak difference is greater than a calibratable threshold MaxDelta, the value of $K_p(t)$ is reduced by an amount Kp_Delta, and when the peak to peak difference is less than or equal to MaxDelta, the value of $K_p(t)$ is increased by Kp_Delta, wherein Kp_Delta is determined and set during calibration testing to be slightly larger than a noise observed during a constant duty cycle command.

15. The clutch system of claim 12, wherein $K_D$ is a derivative gain adjusted in real time by continuously updating the initial starting value of $K_D$ until a pressure control loop is switched on when the pressure command is greater than 0, and wherein the initial starting value of $K_D$ is calculated using a lookup table that is a function of detected temperature of the hydraulic fluid and the target hydraulic pressure.

16. The clutch system of claim 15, wherein calculating $K_D$ when the pressure control loop is switch on comprises:
(1) iteratively calculating a maximum error of detected fluid pressure in each direction of the target hydraulic pressure and storing the maximum error over time;
(2) comparing a current maximum error to a past maximum error to determine if a sign of error amplitude has changed, and each time the error amplitude sign changes, calculating a peak to peak difference between the current maximum error and the past maximum error;
(3) when the peak to peak difference is greater than a calibratable threshold MaxDelta, the value of $K_D$ is reduced by an amount Kd_Delta, and when the peak to peak difference is less than or equal to MaxDelta, the value of $K_D$ is increased by Kd_Delta, wherein Kd_Delta is determined and set during calibration testing to be slightly larger than a noise observed during a constant duty cycle command.

17. The clutch system of claim 12, wherein $K_i$ is an integral gain adjusted using a ratio factor of $$KiRatio = sat\left(\frac{ClutchPress}{PressureTarget}, 0\ 1\right)$$

where ClutchPress is a detected hydraulic pressure and PressureTarget is the target hydraulic pressure.

18. The clutch system of claim 12, wherein the parameter $K_{sm}$ is a sliding mode gain adjusted in real time by continuously updating the initial starting value of $K_{sm}$ until a pressure control loop has been switched on when the pressure command is greater than 0, and wherein the initial starting value of $K_{sm}$ is calculated using a lookup table that is a function of a detected temperature of the hydraulic fluid and a detected hydraulic pressure.

19. The clutch system of claim 18, wherein calculating $K_{sm}$ when the pressure control loop is switched on comprises:
(1) iteratively calculating a maximum error of detected fluid pressure in each direction of the target hydraulic pressure and storing the maximum error over time;
(2) comparing a current maximum error to a past maximum error to determine if a sign of error amplitude has changed, and each time the error amplitude sign changes, calculating a peak to peak difference between the current maximum error and the past maximum error;
(3) when the peak to peak difference is greater than a calibratable threshold MaxDelta, the value of $K_{sm}$ is reduced by an amount Ksm_Delta, and when the peak to peak difference is less than or equal to MaxDelta, the value of $K_{sm}$ is increased by Ksm_Delta, wherein Ksm_Delta is determined and set during calibration testing to be slightly larger than a noise observed during a constant duty cycle command;
incrementing a counter value on every iteration when the sign of error amplitude is not changing;
when the counter value exceeds a threshold MaxCounter, incrementing $K_{sm}$ by Ksm_Delta regardless of the peak to peak difference, and
when the sign of error amplitude switches before the counter reaches MaxCounter, and when the peak to peak difference is greater than MaxDelta, decrementing $K_{sm}$,
wherein Ksm_Delta is determined and set during calibration testing to be slightly larger than a noise observed during a constant duty cycle command.

20. The clutch system of claim 12, wherein the feed forward term FF(t) is adjusted by first estimating the valve resistance with a recursive least squares algorithm and then adjusting a duty cycle.

21. The clutch system of claim 1, wherein the actuation piston and the clutch pack are part of an electronic hydraulic limited slip differential.

22. A clutch pressure control system, comprising:
a hydraulic system, comprising an electric motor connected to a clutch actuation piston of the clutch, a pressure control valve connected to the clutch actuation piston, a pressure sensor between the electric motor and the clutch actuation piston, and a temperature sensor between the electric motor and the pressure control valve;
a clutch torque controller, which generates pressure control commands based on the sensed hydraulic pressure and a target hydraulic pressure;
and a valve pressure controller, comprising:
a motor speed profile generator, which converts the pressure control commands from the torque controller into motor speed control commands;
a motor speed controller, which receives commands from the motor speed profile generator and converts them into voltage commands that are sent to the electric motor of the hydraulic system while carrying out a closed loop speed control; and
a valve pressure controller, which converts the pressure control commands into voltage commands that are sent to the pressure control valve of the hydraulic system while carrying out a closed loop pressure control,
wherein the closed loop pressure control is achieved using a combination of a proportional integral derivative, a sliding mode control algorithm, and a feed forward controller, represented by the control equation $$DC_{VALVE} = FF(t) + K_p(t)e + K_i(t)\int e\,dt +$$
$$K_D(t)\frac{de}{dt} + K_{SM}(t) \cdot sat(e, -1, 1) + \text{Dither}(t)$$

where $DC_{VALVE}$ signifies the voltage command for controlling the pressure control valve; FF(t) stands for a time dependent feed forward term, $$K_p(t)e + K_I(t)\int edt + K_D(t)\frac{de}{dt}$$

are the terms used for PID control; $K_{SM}(t)\cdot sat(e,-1,1)$ is the term for the sliding mode control; and Dither(t) is a fixed amplitude square wave.

* * * * *